US011934699B2

(12) United States Patent
Hasegawa et al.

(10) Patent No.: US 11,934,699 B2
(45) Date of Patent: Mar. 19, 2024

(54) LINEAR TAPE FILE SYSTEM UNOPTIMIZED READ DETECTION

(71) Applicant: International Business Machines Corporation, Armonk, NY (US)

(72) Inventors: Tohru Hasegawa, Tokyo (JP); Hiroshi Itagaki, Yokohama (JP); Tsuyoshi Miyamura, Yokohama (JP); Atsushi Abe, Ebina (JP); Shinsuke Mitsuma, Machida (JP); Noriko Yamamoto, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 124 days.

(21) Appl. No.: 17/699,241

(22) Filed: Mar. 21, 2022

(65) Prior Publication Data

US 2023/0297281 A1   Sep. 21, 2023

(51) Int. Cl.
*G06F 3/06* (2006.01)

(52) U.S. Cl.
CPC .......... *G06F 3/0659* (2013.01); *G06F 3/0604* (2013.01); *G06F 3/0613* (2013.01); *G06F 3/0682* (2013.01)

(58) Field of Classification Search
CPC .... G06F 3/0659; G06F 3/0604; G06F 3/0613; G06F 3/0682
See application file for complete search history.

(56) References Cited

U.S. PATENT DOCUMENTS

| | | | |
|---|---|---|---|
| 8,832,234 B1* | 9/2014 | Brooker | H04L 67/1097 709/219 |
| 10,152,993 B1 | 12/2018 | Yamamoto | |
| 2013/0117239 A1* | 5/2013 | Hasegawa | G11B 5/00817 707/E17.007 |
| 2014/0019684 A1 | 1/2014 | Wei | |
| 2016/0203160 A1 | 7/2016 | Sims | |
| 2017/0046077 A1* | 2/2017 | Whitney | G06F 3/0643 |
| 2019/0272106 A1 | 9/2019 | Ashida | |
| 2019/0310938 A1 | 10/2019 | Chakravarty | |
| 2020/0004430 A1* | 1/2020 | Navon | G06F 3/0679 |
| 2020/0364148 A1 | 11/2020 | Lv | |
| 2021/0149590 A1 | 5/2021 | Miyamura | |

(Continued)

FOREIGN PATENT DOCUMENTS

JP   2012088991 A   5/2012

OTHER PUBLICATIONS

International Application No. PCT/CN2023/082462 filed Mar. 20, 2023.

(Continued)

*Primary Examiner* — Michael Krofcheck
(74) *Attorney, Agent, or Firm* — Aaron Pontikos (57) ABSTRACT

A computer-implemented method for unoptimized tape drive read detection is disclosed. The computer-implemented includes determining whether a read order of a trio of related files is consistent with an order in which the trio of related files are stored on a magnetic tape media. The computer-implemented method further includes generating an unoptimized tape drive read warning in response to determining that the read order of the trio of related files is inconsistent with the order in which the trio of related files are stored on the magnetic tape media.

14 Claims, 6 Drawing Sheets

(56) References Cited

U.S. PATENT DOCUMENTS

2022/0300191 A1* 9/2022 Yoshida ................ G06F 3/0643

OTHER PUBLICATIONS

International Search Report and Written Opinion dated May 17, 2023 from International Application No. PCT/CN2023/082462 filed Mar. 20, 2023.
Jensen et al., "Binary Index and Journal Embedding in the Linear Tape File System", 2017 International Conference on Networking, Architecture, and Storage (NAS), 7 pages, DOI: 10.1109/NAS.2017.8026847, Sep. 7, 2017.
Mell et al., "The NIST Definition of Cloud Computing", Recommendations of the National Institute of Standards and Technology, NIST Special Publication 800-145, Sep. 2011, 7 pages.

* cited by examiner

LINEAR TAPE FILE SYSTEM UNOPTIMIZED READ DETECTION

BACKGROUND

The present invention relates generally to the field of tape storage systems, and more particularly to detecting unoptimized read operations in a linear tape file system (LTFS).

A tape drive is a data storage device that reads and writes data on magnetic tape. Current magnetic tape storage technologies allow a tape to be divided into separate writable areas, known as partitions. For example, a linear tape open LTO-8 cartridge may be divided into an Index Partition and three Data Partitions. With the advent of tape partitions, a tape format and file system, known as the Linear Tape File System (LTFS), further allowed for files stored on tape cartridges in a tape library to be accessed in a similar fashion as files stored on a hard disk drive or solid state drive. The LTFS requires both a specific format of data on the tape media and software to provide a file system interface to the data. Each LTFS formatted tape media in the library appears as a separate folder under the filesystem mount point. Applying a file system to a tape drive allows users to organize and search the contents of tape media as files, improving access time for data stored on tape media.

SUMMARY

According to one embodiment of the present invention, a computer-implemented method for unoptimized tape drive read detection is disclosed. The computer-implemented method includes determining whether a read order of a trio of related files is consistent with an order in which the trio of related files are stored on a magnetic tape media. The computer-implemented method further includes generating an unoptimized tape drive read warning in response to determining that the read order of the trio of related files is inconsistent with the order in which the trio of related files are stored on the magnetic tape media.

According to another embodiment of the present invention, a computer program product for unoptimized tape drive read detection is disclosed. The computer program product includes one or more computer readable storage media and program instructions stored on the one or more computer readable storage media. The program instructions include instructions to determine whether a read order of a trio of related files is consistent with an order in which the trio of related files are stored on a magnetic tape media. The program instructions further include, in response to determining that the read order of the trio of related files is inconsistent with the order in which the trio of related files are stored on the magnetic tape media, program instructions to generate an unoptimized tape drive read warning.

According to another embodiment of the present invention, a computer system for unoptimized tape drive read detection is disclosed. The computer system includes one or more computer system includes one or more computer processors, one or more computer readable storage media, and program instructions stored on the computer readable storage media for execution by at least one of the one or more processors. The program instructions include instructions to determine whether a read order of a trio of related files is consistent with an order in which the trio of related files are stored on a magnetic tape media. The program instructions further include, in response to determining that the read order of the trio of related files is inconsistent with the order in which the trio of related files are stored on the magnetic tape media, program instructions to generate an unoptimized tape drive read warning.

DETAILED DESCRIPTION

The present invention relates generally to the field of tape storage systems, and more particularly to detecting unoptimized read operations in a linear tape file system (LTFS).

Linear tape open (LTO) is a magnetic tape data storage technology. LTO storage technology may generally be referred to as an open-format tape storage technology having a single reel of magnetic tape stored in a removable tape cartridge. LTO storage technology provides for additional optional formatting including, but not limited to, compression, Write Once Read Many (WORM), encryption, and Linear Tape File System (LTFS) compatibility. Typically, the most recent generations of LTO tape cartridges can be formatted to include up to four Partitions—1 Index Partition and 3 Data Partitions. However, the number of possible Partitions is dependent on the particular generation of the LTO tape cartridge.

With a linear tape file system (LTFS), file data is generally only written to the Data Partition and metadata (i.e., data describing the file data stored in the Data Partition) is written to the Index Partition. Organizing or partitioning the tape in such a way enables the tape to be self-describing through the use of a file index in the Index Partition. This results in reducing the complexity of data management and data access time for tape storage. Accordingly, a LTFS has made it possible to use magnetic tape storage devices in a similar manner to file systems used with other removable storage systems (e.g., external solid state drives or external hard disk drives).

Although the LTFS facilitates access to files stored on magnetic tape in a similar manner to other forms of storage, in some cases, read access times for file data stored on tape is much slower than that of hard disk drives or solid state drives. This stems from the fact that in order to access file data stored on a magnetic tape, the tape head position may need to be moved in a lateral direction perpendicular to the longitudinal direction and the tape media may need to be wound or unwound in order to align the tape head with a particular wrap and longitudinal position (LPOS) of the tape media where the file data is stored.

Embodiments of the present recognize that since files on a tape medium allow sequential access only, the access time is impacted based on an order in which the file data is read. As an example, assume that three files—File 1, File 2, and File 3 are arranged in chronological order on a LTO-8 formatted tape. If an access request is issued to read these three files in chronological order (File 1, then File 2, and lastly File 3), the read speed will be roughly 360 megabytes per second (MB/s). However, if an access request is issued to read these three files out of chronological order (e.g., File 1, then File 3, and lastly File 2), the read speed will be decreased to roughly several KB/s. This stems from the fact that the LTFS will read the first file, seek forward to read the third file, and then seek back to read the second file. These seek operations drastically increase the file access time, thereby ultimately degrading the multicopy performance of LTFS.

Currently, various software has been developed in order to more efficiently transfer data to and from LTFS tapes. For example, IBM® LTFS Copy Tool copies tape contents with optimum order and improves performance for retrieving files from an LTFS-formatted tape medium. More specifically, the IBM® LTFS Copy Tool reorders the order in which files are accessed, thereby eliminating any unnecessary seek operations. Thus, when consistently used, software such as the IBM® LTFS Copy improves overall copy performance of tape media. However, embodiments of the present invention recognize that oftentimes, users and applications are unaware as to which type of storage medium particular file data is stored on. As a result, users and applications may not utilize a specific copy command, such as ltfscp, when copying file data that is stored on magnetic tape.

For example, assume that a user issues a copy command to copy File 1-File 5 in sequential order using the copy command "CTRL+C." However, unbeknownst to the user, the files are actually recorded on a tape cartridge. Since the user is unaware that the files are stored on a tape cartridge, and therefore the order in which the files are stored, the user was not cognizant of the order in which the files were selected to be copied. Let it be further assumed that the files are stored on the tape cartridge as follows: File 1—Start Block 50, File 2—Start Block 70, File 3—Start Block 10, File 4—Start Block 90, and File 5—Start Block 20. Accordingly, if the files are read in sequential order as per the command "CTRL+C", the read speed will drastically be reduced since the LTFS will read File 1 beginning at Start Block 50, seek forward to read File 2 starting at Start Block 70, then seek back past File 1 and File 2 to read File 3 beginning at Start Block 10, then seek forward past File 1 and File 2 to read File 4 beginning at Start Block 90, and again seek back past Files 1, 2, and 4 to read File 5 beginning at Start Block 50. These seek operations drastically increase the file access time, thereby ultimately degrading the multicopy performance of LTFS.

Embodiments of the present invention provide for the ability to detect unnecessary tape seek operations during multi-file read requests and generate unoptimized read warnings as a result thereof. According to an embodiment of the present invention, as a tape drive reads files stored on a LTFS formatted tape media, the file path, start block, file read operation start time, and file read operation end time of each subsequently read file is recorded in a table. If it is detected that a predetermined number of consecutively read files in a multi-file read request are each read within a predetermined time of each other, and the start block of each consecutively read file does not increase in number, an unoptimized read warning is issued. In an embodiment, in addition to or in lieu of generating an unoptimized read warning, one or more future read requests may automatically be cancelled and one or more new optimized read requests may automatically be generated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
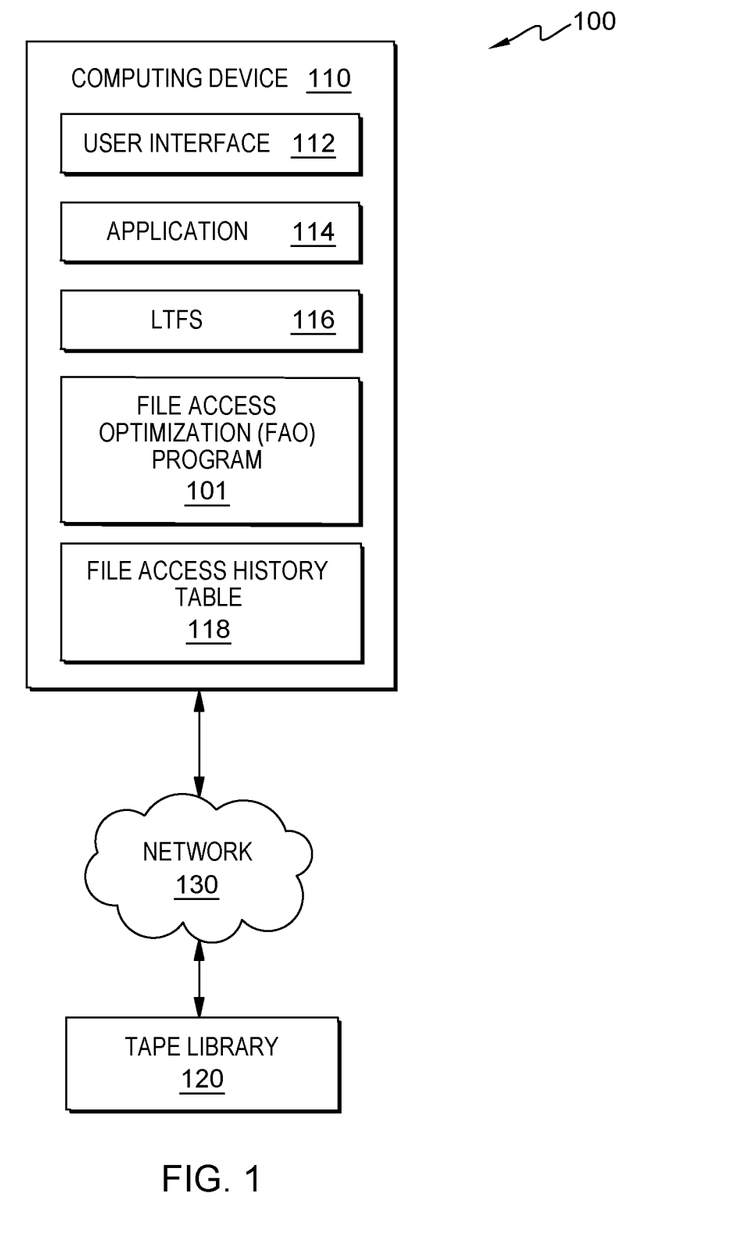
FIG. 1 is a functional block diagram of a storage network, generally designated 100, suitable for operation of a file access optimization (FAO) program 101 in accordance with at least one embodiment of the present invention.

Referring now to various embodiments of the invention in more detail, FIG. 1 is a functional block diagram of a storage network, generally designated 100, suitable for operation of a file access optimization (FAO) program 101 in accordance with at least one embodiment of the present invention. FIG. 1 provides an illustration of only one implementation and does not imply any limitations with regard to the environments in which different embodiments may be implemented. Many modifications to the depicted environment may be made by those skilled in the art without departing from the scope of the invention as recited by the claims.

Storage network 100 includes computing device 110 and tape library 120 interconnected over network 130. In embodiments of the present invention, network 130 can be a telecommunications network, a local area network (LAN), a wide area network (WAN), such as the Internet, a storage area network (SAN), or a combination of the four, and can include wired, wireless, or fiber optic connections. Network 130 may include one or more wired and/or wireless networks that are capable of receiving and transmitting data, voice, and/or video signals, including multimedia signals that include voice, data, and video information. In general, network 130 may be any combination of connections and protocols that will support communications between computing device 110, tape library 120, and other computing devices (not shown) within storage network 100.

Computing device 110 allows a user to write data to and retrieve data from magnetic tape media of tape library 120 via a network, such as network 130. In some embodiments, computing device 110 may be client device, such as a laptop computer, tablet computer, netbook computer, personal computer (PC), a desktop computer, a personal digital assistant (PDA), a smart phone, or any programmable electronic device capable of receiving, sending, and processing data. In some embodiments, computing device 110 can be a standalone device, a management server, a web server, or any other electronic device or computing system capable of receiving, sending, and processing data. In some embodiments, computing device 110 represents a server computing system utilizing multiple computers as a server system, such as in a cloud computing environment. In an embodiment, computing device 110 represents a computing system utilizing clustered computers and components (e.g. database server computers, application server computers, web server computers, etc.) that act as a single pool of seamless resources when accessed within network computing environment 100. In general, host device 110 represents any programmable electronic device or combination of programmable electronic devices capable of executing machine readable program instructions and communicating with tape library 130, and other computing devices (not shown) within storage network 100 via a network, such as network 130.

Figure 4:
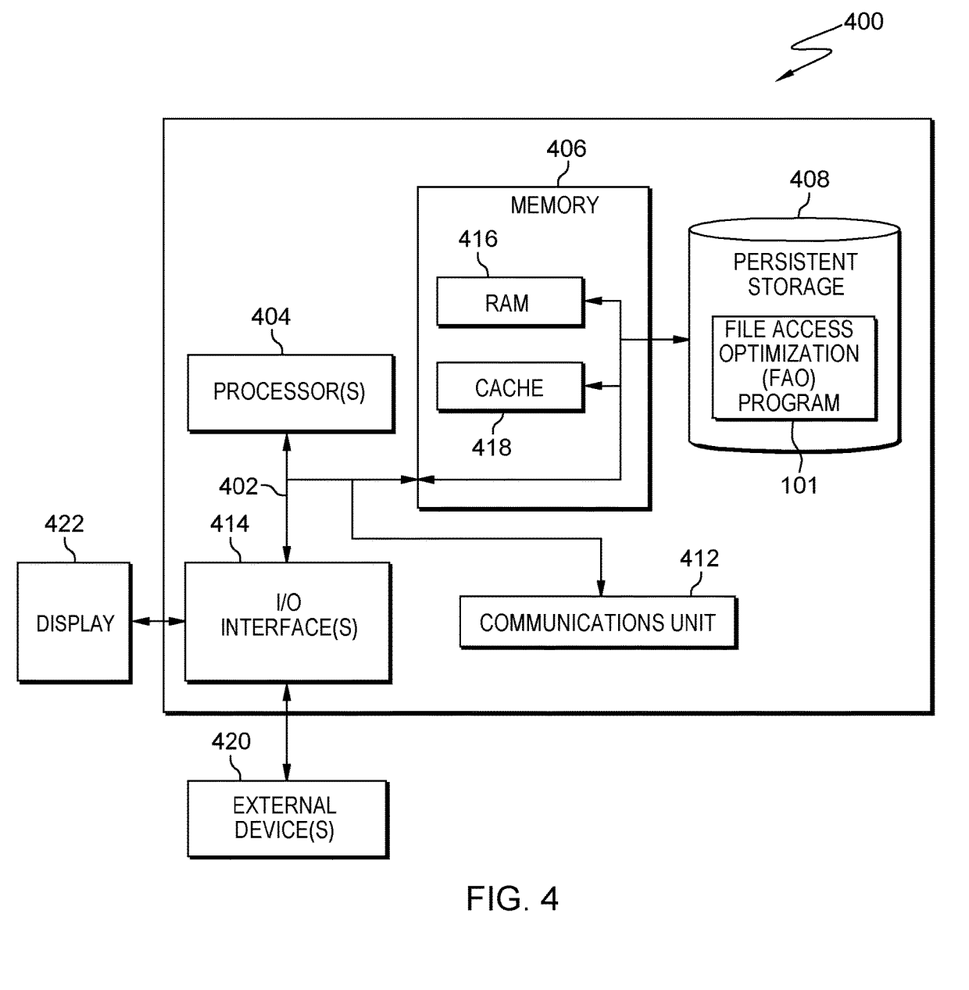
FIG. 4 is a block diagram depicting components of a computer, generally designated 400, suitable for executing a file access optimization (FAO) program 101 in accordance with at least one embodiment of the present invention.

Computing device 110 may include components, as depicted and described in further detail with respect to computer 400 of FIG. 4, in accordance with embodiments of the present invention. Computing device 110 may include components as depicted and described in further detail with respect to cloud computing node 10 of cloud computing environment 50 of FIG. 5, in accordance with embodiments of the present invention.

Computing device 110 includes user interface 112. User interface 112 provides an interface between computing device 110 and tape library 120. In some embodiments, user interface 112 can be a graphical user interface (GUI) or a web user interface (WUI) and can display text, documents, web browser windows, user options, application interfaces and instructions for operation, and includes the information (such as graphic, text, and sound) that a program presents to a user and the control sequences the user employs to control the program. In other embodiments, user interface 112 can be a script, application programming interface (API), or mobile application software that provides an interface between computing device and tape library 120.

Computing device 110 further includes application 114. Application 114 can be representative of one or more applications (e.g., an application suite) that operate on computing device 110. In various example embodiments, application 114 can be an application that a user of computing device 110 utilizes to access file data stored on magnetic tape media in tape library 120 and on computing device 110. In an embodiment, application 114 can be a client-side application associated with an application running on a host device (e.g., a client-side application associated with FAO program 101 in those instances where FAO program 101 is not running on computing device 110). In an embodiment, application 114 can operate to perform processing steps of FAO program 101 (i.e., application 114 can be representative of FAO program 101 operating on computing device 110).

Computing device 110 further includes file access optimization (FAO) program 101. Although FAO program 101 is depicted in FIG. 1 as being integrated with computing device 110, in alternative embodiments, FAO program 101 can be remotely located from computing device 110. In some embodiments, FAO program 101 can be a component of LTFS 116. For example, FAO program 101 can be a software component or sub-system of LTFS 116. In other embodiments, FAO program 101 can be logically distinct from LTFS 116. For example, FAO program 101 can be an application running outside of LTFS 116, such as application 114.

In an embodiment, and as depicted in FIG. 1, FAO program 101 operates on computing device 110, and can be utilized by computing device 110 via an application download from a central server (not depicted) or a third-party application store, and executed on computing device 110. In another embodiment, FAO program 101 may be software, downloaded from a central server (not depicted), and installed on computing device. In another embodiment, FAO program 101 may be utilized as a software service provided by a third-party cloud service provider (not shown). In another embodiment, FAO program 101 may include one or more components, such as add-ons, plug-ins, and agent programs, etc. (not shown) installed on computing device 110.

Computing device 110 further includes linear tape file system (LTFS) 116. A LTFS is a file system that allows files stored on LTFS formatted tape media (e.g., tape cartridges) in tape library 120 to be accessed in a similar fashion as files stored on faster storage media, such as a hard disk drive, solid state drive, or flash drive. It requires both a specific format of data on the tape media and software to provide a file system interface to the data. In an embodiment, computing device 110 mounts and executes contents stored on magnetic tape media as a LTFS, such as LTFS 116 operational on computing device 110. Each LTFS formatted tape media in tape library 120 appears as a separate folder under the filesystem mount point. LTFS 116 can perform direct access to files stored on magnetic tape media in a similar fashion to files stored on a hard disk drive or flash drive. One of ordinary skill in the art will appreciate that applying a file system to a tape drive allows users to organize and search the contents of tape media as they would on hard disk, improving access time for data stored on tape media. For example, LTFS 116 can be an IBM® Linear Tape File System—Library Edition (LTFS-LE) that allows LTFS volumes (i.e., tape media) to be used with a tape library, such as tape library 120. While reference is made to IBM® specific hardware and/or software components, it should be understood that aspects of the present invention may be applied equally to other file system and storage management technologies.

One of ordinary skill in the art will further appreciate that although data stored in LTFS 116 appears to behave like data stored on a hard disk, the fundamental sequential nature of writing data to tape media remains. File data is sequentially written to zones (i.e., logical blocks) of a predetermined, fixed size and files are always appended to the end of the data written to the tape media. Furthermore, if a file stored on one or more data blocks of a magnetic tape media is modified, overwritten or removed, the associated data blocks are not freed up. Rather, the memory allocated to the associated data blocks becomes invalid (i.e., the associated data blocks are no longer referenced in an index) and newly added file data is appended to the end of the data written to the magnetic tape media as separate, non-contiguous blocks.

The term "file" as used herein shall refer to a group of logically related data extents together with associated file meta-data. The term "data extent" as used herein shall refer to a contiguous sequence of recorded blocks (i.e., a set of one or more sequential logical blocks used to store file data). In an embodiment, a file is recorded as one or more extents and each extent corresponds to one or more records. In an embodiment, all records within a data extent have a predetermined storage length (also known as the "block size"). In an embodiment, the default block size is 512 KB or 0.5 MB. In an embodiment, the default block size is 1,024 KB or 1 MB. However, embodiments of the present invention may be practiced having a default block size of any predetermined size.

In an embodiment, the mapping from file byte offsets to block positions is maintained in an Index Partition of the tape media and is generally referred to as an extent list. Each entry in an extent list for a file encodes a range of bytes in the file as a range of contiguous bytes in a data extent. Each data extent included in the extent list includes the following information:
  (i) Start Block—the block number within the data extent where the content for the extent begins;
  (ii) Byte Offset—the number of bytes from the beginning of the start block to the beginning of the file data for the extent;
  (iii) Byte Count—the number of bytes of file content in the data extent; and (iv) File Offset—the number of bytes from the beginning of the file to the beginning of the file data recorded for the extent.

Tape library 120 can be an automated tape storage device that includes a plurality of tape drives for writing to and reading from tape media, such as, but not limited to, single-reel or two-reel magnetic tape cartridges. In an embodiment, tape library 120 can be an IBM TS3400™ Tape Library or an IBM TS3500™ Tape Library. While reference is made to IBM-specific hardware and/or software components, it should be understood that aspects of the present invention may be applied equally to other tape library technologies. In embodiments of the invention, tape library 120 can include a plurality of tape media stored in banks or groups of storage slots. For example, tape media may include, but is not limited to magnetic tape cartridges, magnetic tape cassettes, and optical tape cartridges. Tape library 120 can further include a plurality of slots to hold tape media (e.g., tape cartridges), a barcode reader to identify tape media and an automated method (e.g., a robot) for loading tape media.

In various embodiments of the present invention, one or more tape drives included in tape library 120 are capable of reading file data in both a forwards and backwards direction. For example, assume that File A is written to Blocks 1-3 of a magnetic tape media. Here, the tape drive may be capable of reading the data in a forward direction (from left to right), starting with Block 1 and ending with Block 3. Similarly, the tape drive may be capable of reading the data in a backward direction (from right to left), starting with Block 3 and ending with Block 1.

According to an embodiment of the present invention, FAO program 101 generates a file access history table 118 for a tape media in response to the tape media being mounted as a file system and deletes the read access history table in response to the tape media being unmounted. File access history table 118 includes the file access history of files stored on a magnetic tape during a period of time in which the contents of the magnetic tape are mounted as a LTFS. In an embodiment, file access history table 118 is updated each time a tape drive transitions from reading one file to another file. For example, FAO program 101 detects that the tape drive was previously reading data from File A having file path/dir1/fileA and the tape drive is now reading data from File B having file path/dir1/fileB. In this example, FAO program 101 may update the read completion time of File A and record the file path, read start time, and Starting Block of File B. In an embodiment, for each file read while the tape media is mounted, the file path, start block number, read start time, and read completion time are recorded in file access history table 118. If the same file is read in multiple batches (e.g., due to the size of file), the read completion time of the last batch read is recorded as the read completion time for the file. In an embodiment, file access history table 118 is sorted in ascending order of file read completion times. In other words, the most recent read files are listed at the bottom of the table.

In an embodiment, application 114 determines whether consecutively read files are related. In an alternative embodiment, FAO program 101 determines whether consecutively read files are related. In an embodiment, two consecutively read files are related if they are included in the same access request. For example, File 2 and File 7 are determined to be related if they are included in the same copy request. In an embodiment, two consecutively read files are related if the read completion time of a first file is within a predetermined time period of the read completion time of a second, subsequent file. For example, assume that File B is the next file read by a tape drive after reading File A. File A has a read completion time of 10:00:15 and File B has a read completion time of 10:00:35. Let it further be assumed that two consecutively read files are related if the read completion times between the two files is one second or less. Based on these facts, File A and File B would be determined to be related since the period of time between their read completion times (two tenths of a second) is within one second of each other.

In an embodiment, two consecutively read files are related if the read completion time of a first file is within a predetermined time period of the read start time of a second, subsequent file. For example, assume that File D is the next file read by a tape drive after reading File C. File C has a read completion time of 10:00:10 and File D has a read start time of 10:01:40. Let it further be assumed that two consecutively read files are related if the time period between the read completion time of the first file is within two seconds of the read start time of the second file. Based on these facts, File C and File D would be determined to be related since the period of time between File C's read completion time and File D's read start time (one and a half seconds) is within two seconds of each other.

In an embodiment, FAO program 101 determines whether three or more consecutively read files are related. In other words, a chain of consecutively read files is determined to be related. In an embodiment, three or more consecutively read files are related if each file is included in the same access request. For example, File 2, File 7, and File 11 are all determined to be related to one another if they are included in the same copy request. In an embodiment, three or more consecutively read files are related if each subsequent file in the chain of files has a read completion time within a predetermined time period of the read completion time of the previous file. For example, assume that File A, File B, and File C are read in this order. The read completion times of Files A-C are 10:01, 10:02, and 10:03, respectively. Let it further be assumed that three or more consecutively read files are related if the time period between each subsequent files read completion time is within two seconds of the previous files read completion time. Based on these facts, Files A-C would be determined to be related since the period of time between each subsequent files read completion time is within two seconds of the prior files read completion time.

In an embodiment, three or more consecutively read files are related if each subsequent file in the chain of files has a read start time within a predetermined time period of the read completion time of the previously read file. For example, assume that File D, File E, and File F are read in this order. The read completion time of File D is 10:01, the read start and read completion times of File E are 10:02 and 10:03, respectively, and the read start time of File F is 10:04. Let it further be assumed that three or more consecutively read files are related if the time period between each subsequent files read start time is within two seconds of the read completion time of the previous file. Based on these facts, Files A-C would be determined to be related since the period of time between each subsequent files read start time and the previous files read completion time is within two seconds of each other.

In an embodiment, FAO program 101 determines whether an order in which the consecutively related files are read by the tape drive is consistent with a chronological order in which the consecutively related read files are stored on the tape media. In an embodiment, FAO program 101 compares the starting block number of each respective consecutively related file read in order to determine whether the order in which the files were read match a chronological order in which the files were stored on the tape media. For example, assume that File A, File B, and File C are read in this order and are related to one another. Let it further be assumed that the starting blocks of Files A-C are 10, 40, and 50, respectively. Accordingly, FAO program 101 would determine that the order in which Files A-C were read matches the chronological order in which Files A-C are stored on the magnetic tape media since the starting block number of each consecutively read file increases.

In an embodiment, FAO program 101 determines whether an order in which the consecutively read related files are read by the tape drive is consistent with a reverse chronological order in which the consecutively read related files are stored on the tape media. In an embodiment, FAO program 101 compares the starting block number of each respective consecutively related file read in order to determine whether the order in which the files were read match a reverse chronological order in which the files were stored on the tape media. For example, assume that File C, File B, and File A are read in this order and are related to one another. Let it further be assumed that the starting blocks of Files C-A are 50, 40, and 10, respectively. Accordingly, FAO program 101 would determine that the order in which the files were read matches the reverse chronological order in which the files are stored on the magnetic tape media since the starting block number of each consecutively read file decreases.

In an embodiment, if at least three consecutively read related files are not read in a predetermined order in which the files are stored on the tape media, FAO program 101 generates a tape drive unoptimized read warning. For example, a tape drive unoptimized read warning is generated if the order in which the files read do not match a chronological order or reverse chronological order in which the files were written to the tape media. In other words, a tape drive unoptimized read warning is generated if the respective starting blocks corresponding to at least three consecutively read related files do not incrementally increase or incrementally decrease. For example, the statement "Warning: Multifile read operation is currently reading files out of order from an order in which the files are stored on the tape media" is generated and logged in a log file, displayed to a user via a graphical user interface (GUI) display component, recorded as an event warning on a task bar, or provided as a text or email notification to a system administrator. The user or system can then decide how to proceed. For example, a user may take further action, such as stopping the current read operation and reissuing a new read operation using a ltfscp command.

In an embodiment, if at least three consecutively read related files are not read in an order that is consistent with an order in which the files are stored on the tape media, in addition to or in lieu of generating an unoptimized read warning, FAO program 101 automatically reorders the order in which any remaining unread related files are read by the tape drive. In an embodiment FAO program 101 determines the starting block numbers for any remaining unread files and reorders these files in ascending order or descending order of start block number. In an embodiment, whether the remaining unread files are arranged in ascending order or descending order of start block number is based, at least in part, on the shorter of the tape seek distance between an end block of a currently read file, and the highest start block number and lowest start block number of the remaining unread files. For example, assume that the end block of the current file being read is 50, and the highest and lowest starting blocks of the remaining unread files are 40 and 100, respectively. Since the tape seek distance from end block 50 to starting block 40 is shorter than the tape seek distance from end block 50 to starting block 100, FAO program 101 reorders the remaining unread files in ascending order of starting block number, beginning with starting block 40. In another example, assume that the end block of the current file being read is 100, and the highest, and lowest starting blocks of the remaining unread files are 110 and 20, respectively. Since the tape seek distance from end block 100 to starting block 110 is shorter than the tape seek distance form end block 100 to starting block 20, FAO program 101 reorders the remaining unread files in descending order of starting block number, beginning with starting block 110. In an embodiment, the reordering of read operations is conducted while the tape drive continues to read subsequent consecutively related files from the tape media. This ensures that any access operations remain uninterrupted. Once any remaining unread related files have been reordered, FAO program 101 begins reading the remaining unread files in the newly arranged read order.

According to another embodiment of the present invention, FAO program 101 monitors file read operations performed on a magnetic tape media mounted as a linear tape file system (LTFS). In an embodiment, FAO program 101 determines whether a change in the current file being read has occurred. If a change in the current file being read is not detected, FAO program 101 continues to monitor read processing for a current file being read for completion of read processing of the current file. If a change in the current file being read is detected, FAO program 101 determines whether the new, currently read file is a consecutive file. In an embodiment, a consecutive file is a file in which read processing occurs within a predetermined time period of a read completion time of the prior file. If the new, currently read file is determined to be a consecutive file, FAO program 101 updates file access history table 118 with the file path, read start time, read completion time, and starting block of the file once reading of the file is complete.

In an embodiment, in response to updating file access history table 118, FAO program 101 determines whether three consecutive files have been recorded in file access history table 132. If FAO program 101 determines that three consecutive files have not been recorded in file access history table 118, FAO program 101 returns to monitoring file read operations performed while the magnetic tape media is mounted as a LTFS. If FAO program 101 determines that three consecutive files have been recorded in file access history table 118, FAO program 101 determines whether the starting block number of a file increases for each consecutively recorded file. If FAO program 101 determines that the starting block number of a file increases for each consecutively recorded file, FAO program 101 returns to monitoring file read operations performed while the magnetic tape media is mounted as a LTFS. If FAO program 101 determines that the starting block number of a file does not increase for each consecutively recorded file, FAO program 101 generates a tape drive unoptimized read warning.

Figure 2:
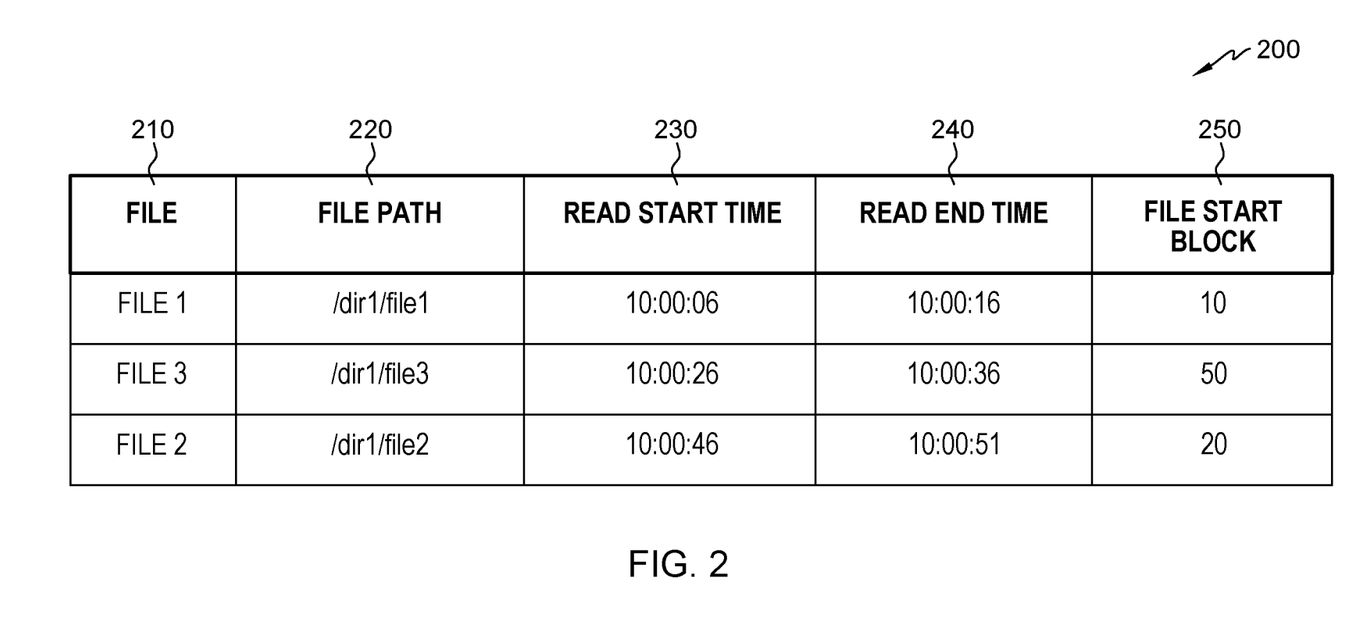
FIG. 2 is a block diagram illustrating an exemplary file access history table, generally designated 200, in accordance with at least one embodiment of the present invention.

FIG. 2 is a block diagram illustrating an exemplary file access history table, generally designated 200, in accordance with at least one embodiment of the present invention. As depicted in FIG. 2, file access history table 200 has been generated in response to mounting file system directory 1 (dir1) corresponding to the contents of a magnetic tape media. File access history table 200 includes a file column 210, a file path column 220, a read start time column 230, a read end time column 240, and a file start block column 250. Various file paths, read start times, read end times, and file start blocks have been recorded for File 1, File 2 and File 3. As further depicted by file access history table 200, the files are listed in chronological order of read start times.

Figure 3:
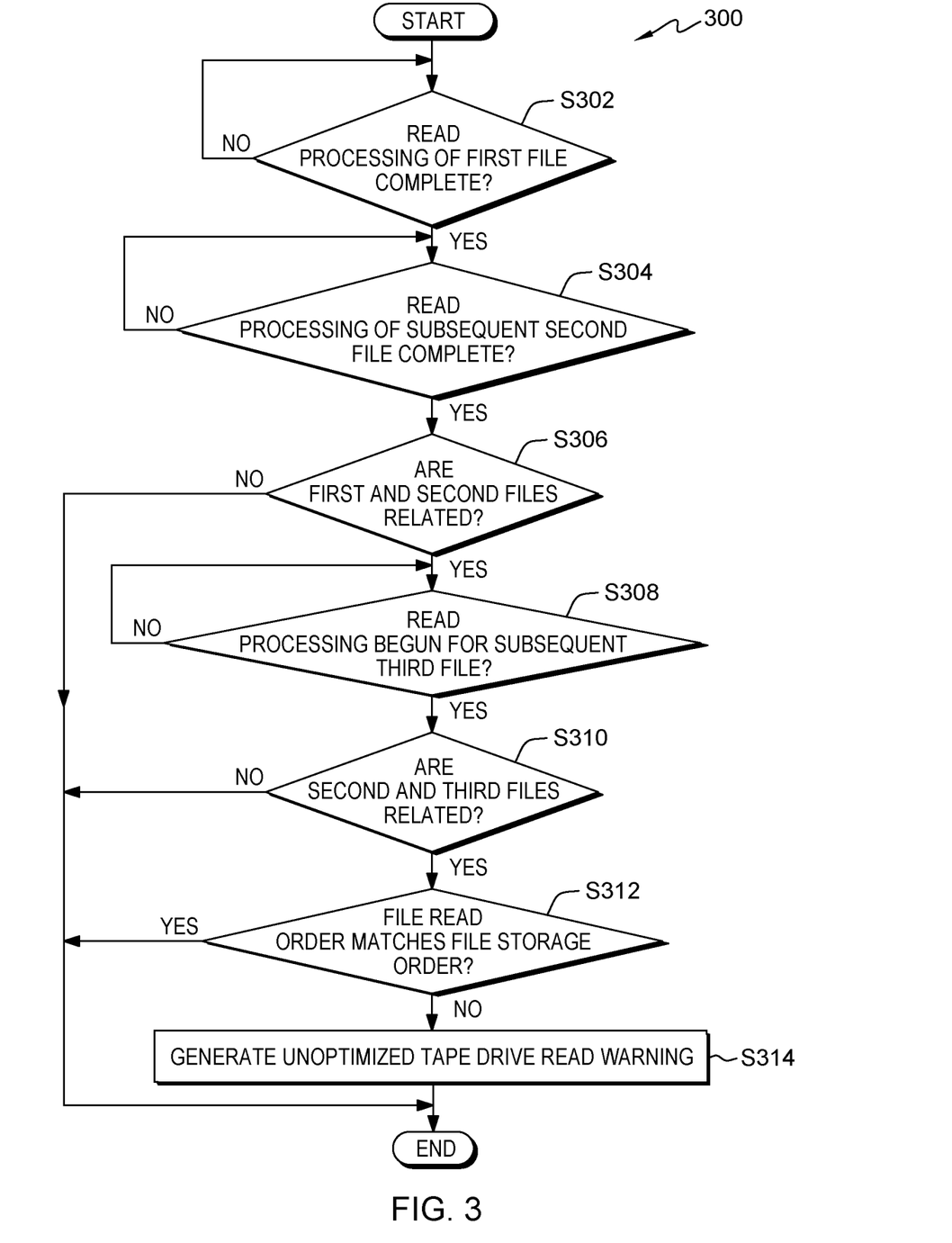
FIG. 3 is a flowchart diagram depicting operational steps for detecting unoptimized magnetic tape read operations by a file access optimization (FAO) program 101, generally designated 300, in accordance with at least one embodiment of the present invention can be seen.

FIG. 3 is a flowchart diagram depicting operational steps for detecting unoptimized magnetic tape read operations by a file access optimization (FAO) program 101 in accordance with at least one embodiment of the present invention can be seen. It should be appreciated that FIG. 3 provides only an illustration of one embodiment and does not imply any limitations with regard to the environments in which different embodiments may be implemented. Many modifications to the depicted environment may be made.

At decision step S302, FAO program 101 determines whether read processing is complete for a first file stored on a LTFS formatted magnetic tape media. If it is determined that read processing of the first file is not complete, (decision step "NO" branch), FAO program 101 returns to decision step S302. If it is determined that read processing of the first file is complete (decision step "YES" branch), FAO program 101 proceeds to decision step S304.

At decision step S304, FAO program 101 determines whether read processing for a second file read subsequent to the first file is complete. If it is determined that read processing of the second file read subsequent to the first file is not complete, (decision step "NO" branch), FAO program 101 returns to decision step S304. If it is determined that read processing of the second file read subsequent to the first file is complete, (decision step "YES" branch), FAO program proceeds to decision step S306.

At decision step S306, FAO program 101 determines whether the first and second files are related. If it is determined that the first and second files are not related (decision step "NO branch"), FAO program 101 proceeds to END and the process terminates. If it is determined that the first and second files are related (decision step "YES" branch), FAO program 101 proceeds to decision step S308.

At decision step S308, FAO program 101 determines whether read processing of a third file read subsequent to the second file has begun. If it is determined that read processing of the third file read subsequent to the second file has not begun, (decision step "NO" branch), FAO program 101 returns to decision step S308. If it is determined that read processing of the third file read subsequent to the second file has begun, (decision step "YES" branch), FAO program 101 proceeds to decision step S310.

At decision step S310, FAO program 101 determines whether the second and third files are related. If it is determined that the second and third files are not related (decision step "NO branch"), FAO program 101 proceeds to END and the process terminates. If it is determined that the second and third files are related (decision step "YES" branch), FAO program 101 proceeds to decision step S312.

At decision step S312, FAO program 101 determines whether a read order of a trio of consecutively read files is consistent with an order in which the trio of files are stored on the tape media. If it is determined that the read order of the trio of consecutively read files is consistent with an order in which the trio of files are stored on the tape media (decision step "YES" branch), FAO program 101 proceeds to END and terminates. If it is determined that the read order of the trio of consecutively read files is not consistent with an order in which the trio of files are stored on the tape media (decision step "NO" branch), FAO program 101 proceeds to step S314.

At step S314, FAO program 101 generates a tape drive unoptimized read warning.

FIG. 4 is a block diagram depicting components of a computing device, generally designated 400, suitable for executing FAO program 101 in accordance with at least one embodiment of the present invention. For example, computing device 400 is representative of computing device 110 depicted in FIG. 1. Computing device 400 includes one or more processor(s) 404 (including one or more computer processors), communications fabric 402, memory 406 including, RAM 416 and cache 418, persistent storage 408, communications unit 412, I/O interface(s) 414, display 422, and external device(s) 420. It should be appreciated that FIG. 4 provides only an illustration of one embodiment and does not imply any limitations with regard to the environments in which different embodiments may be implemented. Many modifications to the depicted environment may be made.

As depicted, computing device 400 operates over communications fabric 402, which provides communications between computer processor(s) 404, memory 406, persistent storage 408, communications unit 412, and input/output (I/O) interface(s) 414. Communications fabric 402 can be implemented with any architecture suitable for passing data or control information between processor(s) 404 (e.g., microprocessors, communications processors, and network processors), memory 406, external device(s) 420, and any other hardware components within a system. For example, communications fabric 402 can be implemented with one or more buses.

Memory 406 and persistent storage 408 are computer readable storage media. In the depicted embodiment, memory 406 includes random-access memory (RAM) 416 and cache 418. In general, memory 406 can include any suitable volatile or non-volatile one or more computer readable storage media.

Program instructions for FAO program 101 can be stored in persistent storage 408, or more generally, any computer readable storage media, for execution by one or more of the respective computer processor(s) 404 via one or more memories of memory 406. Persistent storage 408 can be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

Media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 can include one or more network interface cards. Communications unit 412 may provide communications through the use of either or both physical and wireless communications links. In the context of some embodiments of the present invention, the source of the various input data may be physically remote to computing device 400 such that the input data may be received, and the output similarly transmitted via communications unit 412.

I/O interface(s) 414 allows for input and output of data with other devices that may operate in conjunction with computing device 400. For example, I/O interface(s) 414 may provide a connection to external device(s) 420, which may be as a keyboard, keypad, a touch screen, or other suitable input devices. External device(s) 420 can also include portable computer readable storage media, for example thumb drives, portable optical or magnetic disks, and memory cards. Software and data used to practice embodiments of the present invention can be stored on such portable computer readable storage media and may be loaded onto persistent storage 408 via I/O interface(s) 414. I/O interface(s) 414 also can similarly connect to display 422. Display 422 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
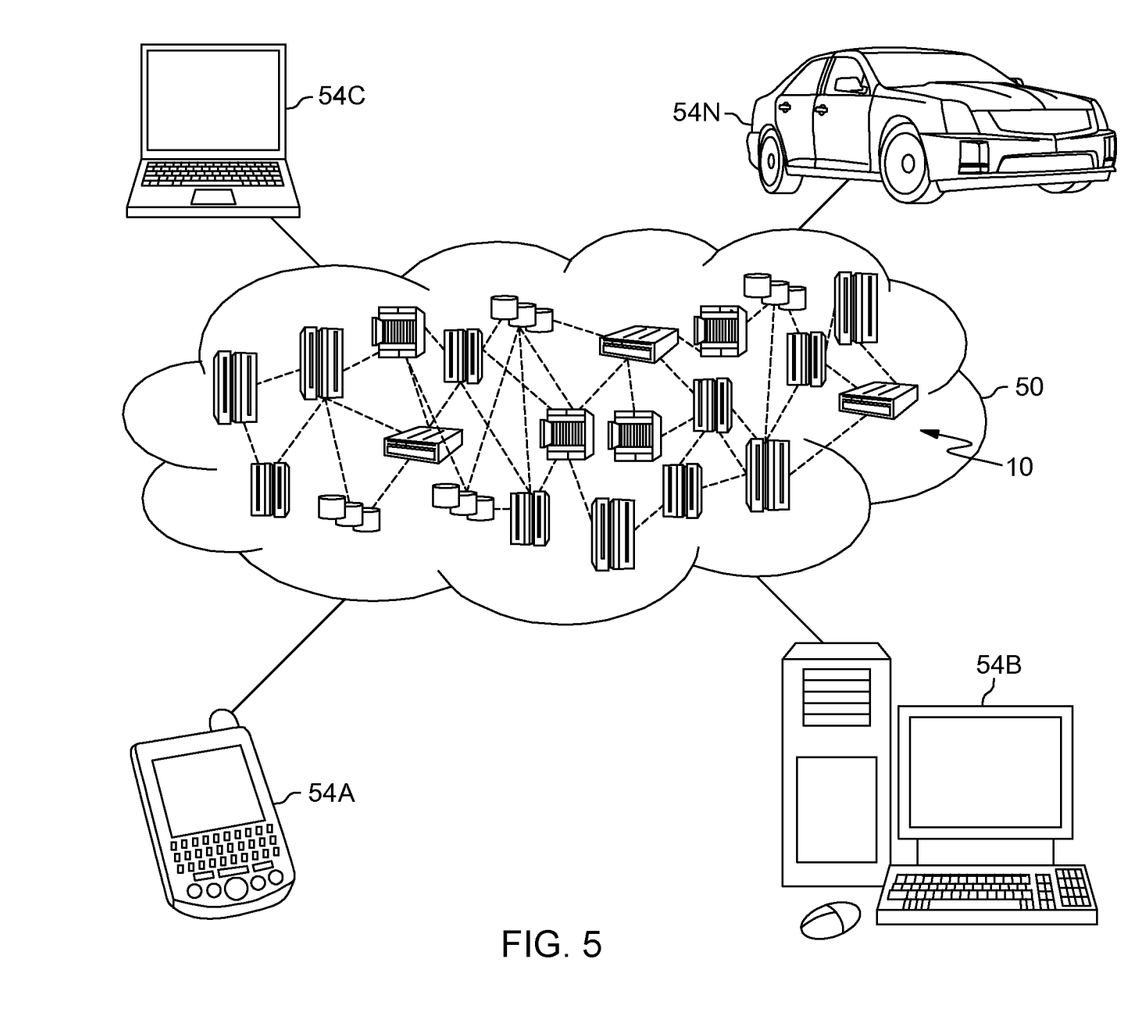
FIG. 5 is a block diagram depicting a cloud computing environment in accordance with at least one embodiment of the present invention.

FIG. 5 is a block diagram depicting a cloud computing environment 50 in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
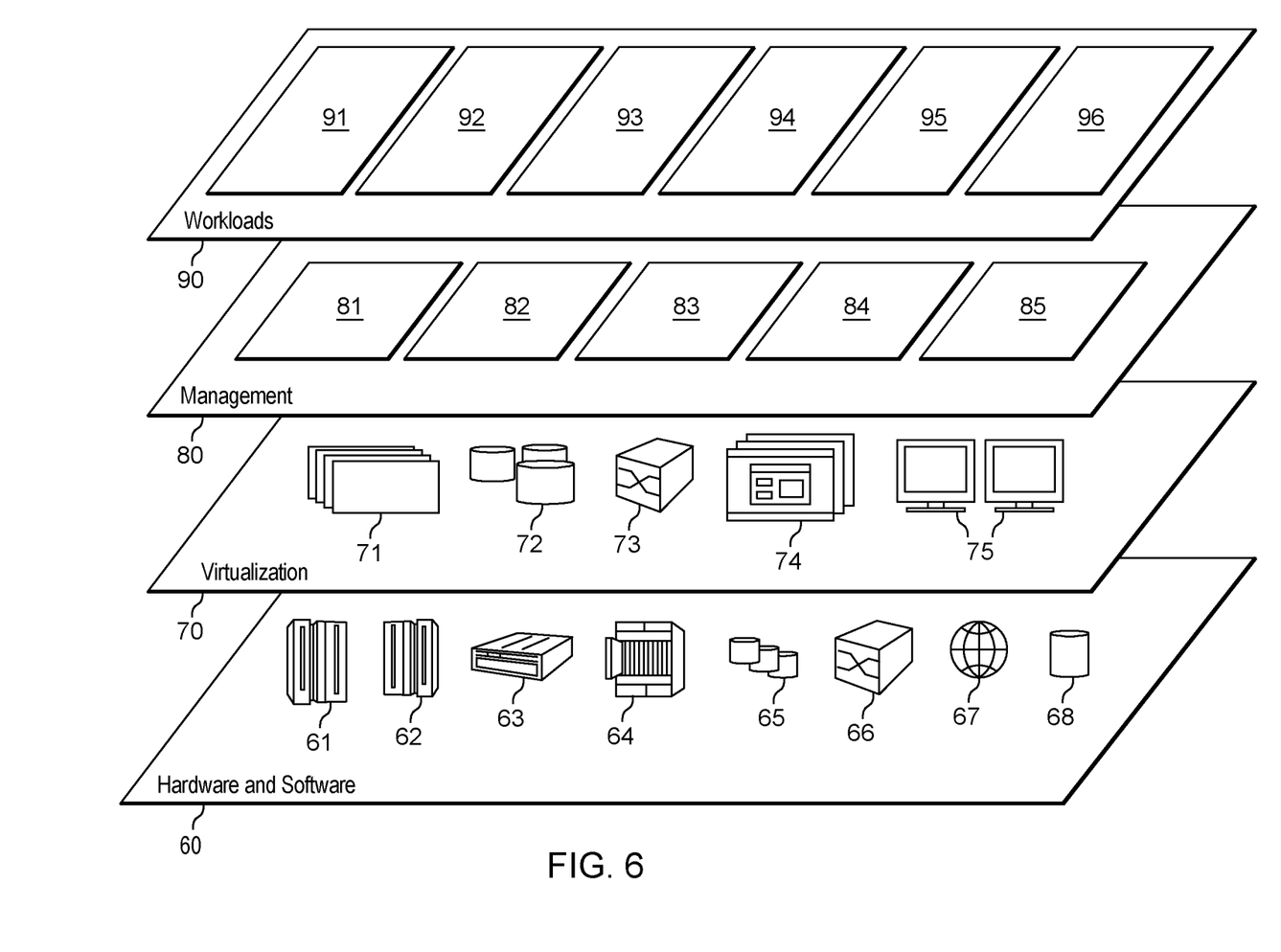
FIG. 6 is block diagram depicting a set of functional abstraction model layers provided by the cloud computing environment depicted in FIG. 5 in accordance with at least one embodiment of the present invention.

FIG. 6 is block diagram depicting a set of functional abstraction model layers provided by cloud computing environment 50 depicted in FIG. 5 in accordance with at least one embodiment of the present invention. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and tape drive unoptimized read detection 96.

What is claimed is:

1. A computer-implemented method for unoptimized tape drive read detection, comprising:
    determining whether a read order of a trio of consecutively read related files is consistent with an order in which the trio of consecutively read related files are stored on a magnetic tape media, wherein the read order of the trio of consecutively read related files is determined to be consistent with the order in which the trio of consecutively read files are stored on the magnetic tape media based on:
        comparing the read order of the trio of consecutively read related files to a starting block number of each file in the trio of consecutively read related files, and
        determining that either the starting block number of each file in the trio of consecutively read related files increases or that the starting block number of each file in the trio of consecutively read files decreases; and
    responsive to determining that the read order of the trio of consecutively read related files is inconsistent with the order in which the trio of consecutively read related files are stored on the magnetic tape media:
        generating an unoptimized tape drive read warning.

2. The computer-implemented method of claim 1, further comprising:
    determining that two consecutively read files are related based, at least in part, on the two consecutively read files being included in a same file access request.

3. The computer-implemented method of claim 1, further comprising:
    determining that two consecutively read files are related based, at least in part, on a first consecutively read file having a read end time within a predetermined period of time of a read start time of a second consecutively read file.

4. The computer-implemented method of claim 1, further comprising:
    determining that two consecutively read files are related based, at least in part, on a first consecutively read file having a read end time within a predetermined period of time of a read end time of a second consecutively read file.

5. The computer-implemented method of claim 1, further comprising:
    automatically reordering in ascending order of starting block number an order in which each remaining unread file related to the trio of consecutively read files is read.

6. A computer program product for unoptimized tape drive read detection, the computer program product comprising a computer readable storage medium and program instructions stored on the one or more computer readable storage medium, the program instructions including instructions to:
    determine whether a read order of a trio of consecutively read related files is consistent with an order in which the trio of consecutively read related files are stored on a magnetic tape media, wherein the read order of the trio of consecutively read related files is determined to be consistent with the order in which the trio of consecutively read files are stored on the magnetic tape media based on:
        comparing the read order of the trio of consecutively read related files to a starting block number of each file in the trio of consecutively read related files, and
        determining that either the starting block number of each file in the trio of consecutively read related files increases or that the starting block number of each file in the trio of consecutively read files decreases; and
    responsive to determining that the read order of the trio of consecutively read related files is inconsistent with the order in which the trio of consecutively read related files are stored on the magnetic tape media:
        generate an unoptimized tape drive read warning.

7. The computer program product of claim 6, further comprising instructions to:
    determine that two consecutively read files are related based, at least in part, on the two consecutively read files being included in a same file access request.

8. The computer program product of claim 6, further comprising instructions to:

determine that two consecutively read files are related based, at least in part, on a first consecutively read file having a read end time within a predetermined period of time of a read start time of a second consecutively read file.

9. The computer program product of claim 6, further comprising instructions to:
determine that two consecutively read files are related based, at least in part, on a first consecutively read file having a read end time within a predetermined period of time of a read end time of a second consecutively read file.

10. The computer program product of claim 6, further comprising instructions to:
automatically reorder in ascending order of starting block number an order in which each remaining unread file related to the trio of consecutively read files is read.

11. A computer system for unoptimized tape drive read detection, the computer system comprising:
one or more computer processors;
one or more computer readable storage media; and
computer program instructions, the computer program instructions being stored on the one or more computer readable storage media for execution by the one or more computer processors, and the computer program instructions including instructions to:
determine whether a read order of a trio of consecutively read related files is consistent with an order in which the trio of consecutively read related files are stored on a magnetic tape media, wherein the read order of the trio of consecutively read related files is determined to be consistent with the order in which the trio of consecutively read files are stored on the magnetic tape media based on:
comparing the read order of the trio of consecutively read related files to a starting block number of each file in the trio of consecutively read related files, and
determining that either the starting block number of each file in the trio of consecutively read related files increases or that the starting block number of each file in the trio of consecutively read files decreases; and
responsive to determining that the read order of the trio of consecutively read related files is inconsistent with the order in which the trio of consecutively read related files are stored on the magnetic tape media: generate an unoptimized tape drive read warning.

12. The computer system of claim 11, further comprising instructions to:
determine that two consecutively read files are related based, at least in part, on the two consecutively read files being included in a same file access request.

13. The computer system of claim 11, further comprising instructions to:
determine that two consecutively read files are related based, at least in part, on a first consecutively read file having a read end time within a predetermined period of time of a read start time of a second consecutively read file.

14. The computer system of claim 11, further comprising instructions to:
determine that two consecutively read files are related based, at least in part, on a first consecutively read file having a read end time within a predetermined period of time of a read end time of a second consecutively read file.

* * * * *